Figure 1:
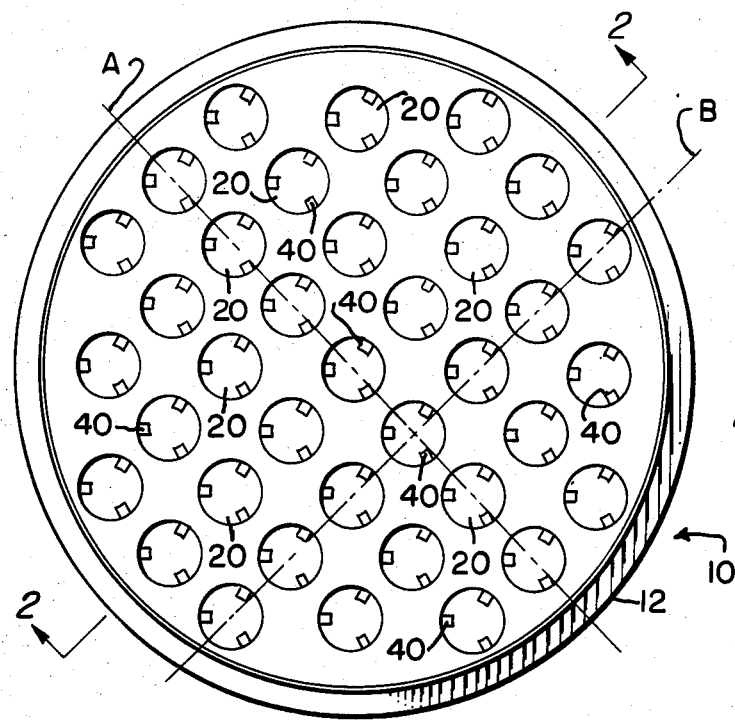

United States Patent [19]

Bennitt

[11] Patent Number: 4,607,660
[45] Date of Patent: Aug. 26, 1986

[54] UNI-DIRECTIONAL-FLOW, FLUID VALVE ASSEMBLY

[75] Inventor: Robert A. Bennitt, Painted Post, N.Y.

[73] Assignee: Ingersoll-Rand Company, Woodcliff Lake, N.J.

[21] Appl. No.: 733,081

[22] Filed: May 13, 1985

[51] Int. Cl.⁴ ............................................. F16K 15/02
[52] U.S. Cl. ................................................. 137/512.1
[58] Field of Search ............. 137/512.1, 512.2, 516.11, 137/516.13, 516.15

[56] References Cited

U.S. PATENT DOCUMENTS 2,891,571  6/1959  Sparks ............................... 137/512.1
3,279,492 10/1966  Bell et al. ............................ 137/594

FOREIGN PATENT DOCUMENTS 1010004 11/1965 United Kingdom ............. 137/512.1

Primary Examiner—Alan Cohan
Assistant Examiner—John A. Rivell
Attorney, Agent, or Firm—Bernard J. Murphy

[57] ABSTRACT

In the depicted embodiment, the novel valve assembly comprises a pair of valving plates in which are formed separate, circular, and walled valving chambers. One plate is in surmounting relationship to the others, so that the valving chambers subsist in a plurality of tiers. All the chambers, however, are in given rows which are common to both tiers, and any one chamber, depending upon which tier it is in, either overlies or underlies a portion of another, adjacent chamber in the other tier. Consequently, a great through-flow volume of fluid is accommodated in a considerably compacted, overall valve assembly area. Notwithstanding such an integration of the valving chambers, no one thereof obstructs the fluid flow through any other thereof. Each of the chambers has its own inlet and outlet ports, valving element moveable therewithin, and spring for biasing the valving element in a given direction.

14 Claims, 4 Drawing Figures

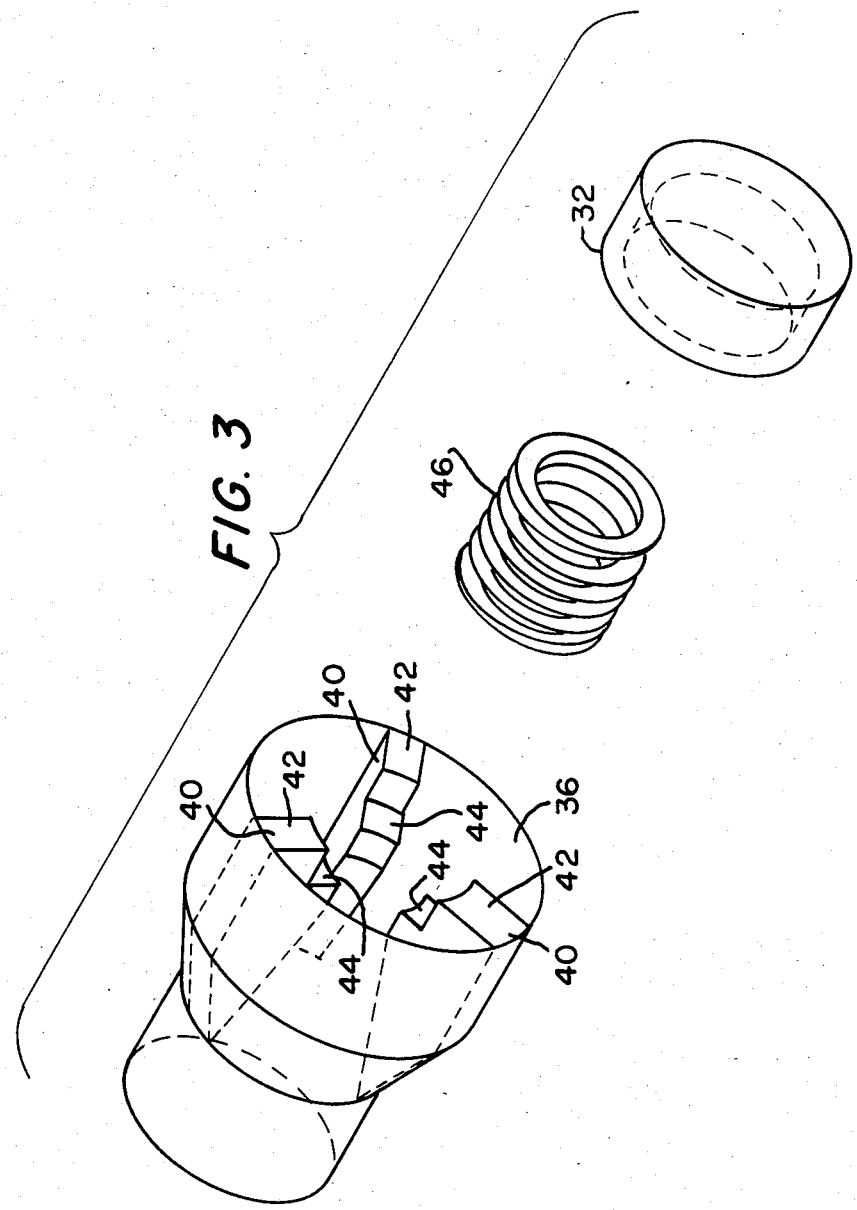

UNI-DIRECTIONAL-FLOW, FLUID VALVE ASSEMBLY

This invention pertains to fluid valves, and in particular to uni-directional-flow, fluid valve assemblies which accommodate a great through-flow volume of fluid in a considerably restricted, overall area.

Valve assemblies of the aforesaid type, to which the invention pertains, are known in the prior art. Typically, they comprise single-tiered, multi-layered structures in which, however, there are unacceptable flow losses due to fluid-flow obstructions presented by one tier to the other thereof. Too, such prior art types of valves have considerably large clearance volumes which, therefore, diminish the efficiency thereof.

There has long been a need for an efficient, tiered, uni-directional-flow, fluid valve assembly which can be accommodated in a small area, which affords a considerable through-flow volume of fluid, and which does not manifest significant flow losses. It is an object of this invention, then, to set forth just such an efficient, novel valve assembly.

It is particularly an object of this invention to disclose a substantially circular, uni-directional flow, fluid valve assembly, having a given diameter, comprising means defining pluralities of rows of separate, circular and walled valving chambers; wherein each chamber of said rows thereof has a first port opening thereinto for admitting fluid therein, and a second port opening thereinto for discharging fluid therefrom; each chamber further has, therewithin, a valving element movable to and from one of said ports, for occluding and exposing, respectively, said one port; a cross-section taken fully along said given diameter of said assembly has a given length, and bisects one of said rows of said valving chambers across the diameters of each of said chambers in said one row; and the sum of the lengths of said diameters of said chambers in said one row is greater than said given length.

Figure 2:
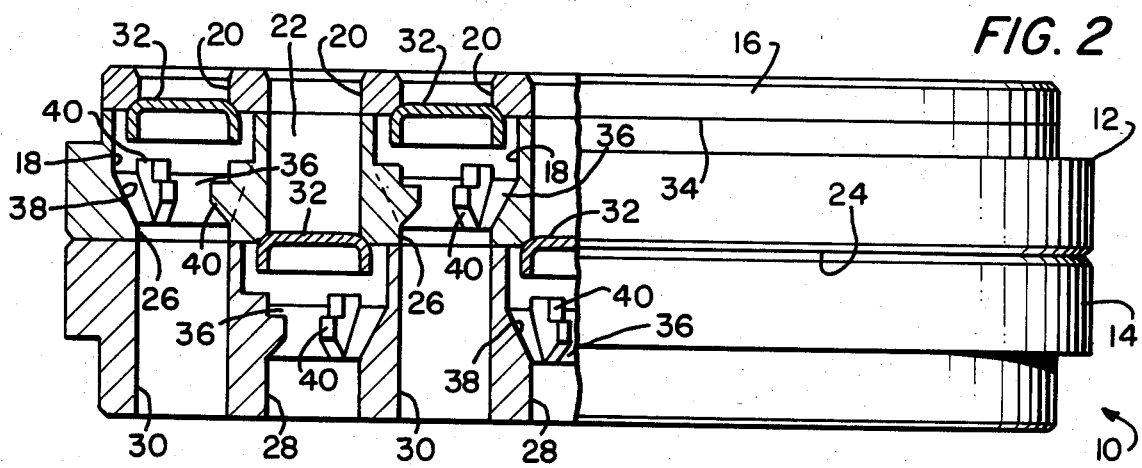
Figure 2A:
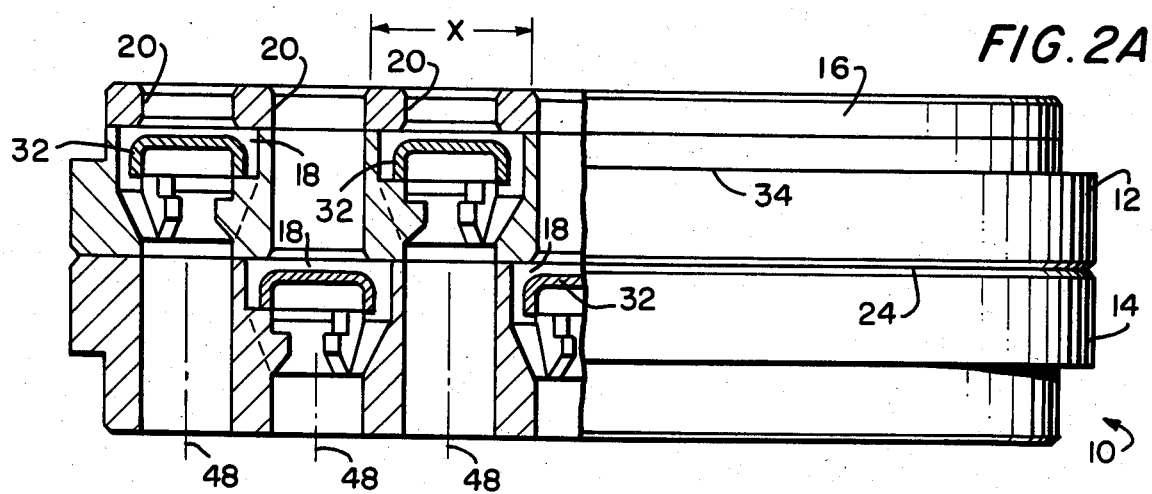

Further objects of this invention, as well as the novel features thereof will become more apparent by reference to the following description, taken in conjunction with the accompanying figures, in which:

FIG. 1 is a plan or top view of an embodiment of the invention which represents the best mode contemplated by the inventor of carrying out his invention, the same having the valving elements and springs omitted for purposes of clarity; i.e., to show the spring-receiving lands of the ribs;

FIG. 2 is a side elevational view of the embodiment of FIG. 1, half thereof being shown in cross-section taken from section 2—2 of FIG. 1; the cross-sectional view (portion) has the springs omitted for purposes of clarity, i.e., more clearly to depict the ribs; the novel valve assembly shown in FIG. 2 is illustrative of the valving elements, and hence the valve assembly itself, in closed disposition;

FIG. 2A is a view of the novel valve assembly which is identical to FIG. 2, except that the valving elements, and valve assembly, are shown in the open disposition; and FIG. 3 is a greatly enlarged illustration of the valving element, spring, and dual-land ribs, which are common to each thereof in each tier, the aforesaid structures shown in relationship to the associated fluid through-flow envelope therefor formed in each valving plate.

As shown in the Figures, the novel valve assembly 10, according to the depicted embodiment thereof, comprises first and second valving plates 12 and 14, the former being atop the latter, and the two being secured together (by hardware not shown). A stop plate 16 is similarly secured atop valving plate 12. The second, alternate apertures 20 define conduits for communicating with first ports 22 (formed in plate 12) for chambers 18 which are formed in plate 14.

Each of the chambers 18 have second ports opening thereinto as well. The underlying surface 24 of plate 12, i.e., the surface thereof which engages plate 14, has a plurality of openings 26 formed therein, the same defining the aforesaid second ports for chambers 18 in plate 12. Plate 14 has a plurality of openings 28 formed therein which define the second ports for the chambers 18 subsisting within plate 14. Further, the latter plate has a plurality of conduits 30 formed therein for communicating with the second ports 26 (formed in plate 12) for chambers 18 which subsist in plate 12.

In each of the chambers 18 there is a cup-shaped valving element 32, the same being movable therewithin. Surface 24 of plate 12 comprises a stop surface for the elements 32 which move within the chambers 18 in plate 14. Similarly, the underlying surface 34 of plate 16 defines a stop surface for the element 32 which move within the chamber 18 in plate 12.

Each chamber 18 has a passageway 36 communicating therewith, such passageways being formed in the plates (12 and 14) in which are formed the chambers 18 with which they communicate. Each passageway 36, however, is identical with each of the others thereof; each comprises a conical wall 38 from which, intruding into the passageway 36, are three ribs 40. The ribs 40 are spaced apart one hundred and twenty degrees of arc (approximately) from each other within the passageways 36. Each rib has a first land 42 which, with such lands 42 on the other two ribs 40 in a passageway 36, defines a seat for the valving element 32 upon the element removing from the first ports (20 and 22). Each rib 40 also has a second land 44 upon which to receive one end of a spring 46. Springs 46 nest within the valving elements 32, at one end thereof, and set against the lands 44. Hence, elements 32 are biased toward, and in closure of, the first ports (20 and 22).

Each chamber 18, together with its associated passageway 36, first ports 20 or 22, and second ports 26 or 28 has a flow-path axis 48. Axes 48 are linear and parallel; no one axis 48 is obstructed by any other thereof. Too, no ports, conduits 20 or 30, passageways 36 impede fluid through any others thereof. Even so, the flow-path axes 48 are efficiently compacted in a relatively small area by the novel manner in which chambers, passageways and ports are formed in the two tier arrangement presented by plates 12, 14 and 16. This is made more evident by some exemplary measurements.

In FIG. 1 the diameter of the valve assembly occupies the plane "A". In this exemplary embodiment of the invention, the assembly 10 has a diameter of six and three-quarter inches. Now, it will be seen that plane "A" bisects seven chambers 18, directly across the diameters of each thereof. The sum of the diameters of the seven bisected chambers is greater than the aforesaid six and three-quarter inches. The sum is almost seven inches. Precisely, in this embodiment, each chamber has a diameter of 0.984-inch, so that the seven thereof, summed, comes to 6.888-inches. In fact, if a chordal cross-section were to be taken through a plane "B", here too the cross-sectional length would be less than the sum of the bisected chambers 18. Along plane "B", the chordal length is six and a half inches, and of course, the seven summed chamber diameters are the 6.888-inches.

The actual dimensions comprised by the exemplary, depicted embodiment are not material. What is significant is that I've taught how to compact a great quantity of efficient fluid flow paths, without obstructing any thereof, and having each hew to a linear axis 48, in a considerably restricted area. Accordingly, while I have described my invention in connection with a specific embodiment thereof, it is to be clearly understood that this is done only by way of example, and not as a limitation to the scope of my invention, as set forth in the objects thereof and in the appended claims.

I claim:

1. A substantially circular, uni-directional flow, fluid valve assembly, having a given diameter, comprising:
    means defining pluralities of rows of separate, circular and walled valving chambers; wherein
    each chamber of said rows thereof has a first port opening thereinto for admitting fluid therein, and a second port opening thereinto for discharging fluid therefrom;
    each chamber further has, therewithin, a valving element movable to and from one of said ports, for occluding and exposing, respectively, said one port;
    a cross-section taken fully along said given diameter of said assembly is of a given dimension, and bisects one of said rows of said valving chambers across the diameters of each of said chambers in said one row; and
    the sum of the dimensions of said diameters of said chambers in said one row is greater than said given dimension.

2. A fluid valve assembly, according to claim 1, wherein:
    said cross-section defines a plane; and
    alternate ones of said chambers, along said plane, each overlie a portion of another of said chambers along said plane.

3. A fluid valve assembly, according to claim 1, wherein:
    said cross-section defines a plane; and
    alternate ones of said chambers, along said plane, each underlie a portion of another of said chambers along said plane.

4. A substantially circular, uni-directional-flow, fluid valve assembly, having a given diameter, comprising:
    means defining pluralities of rows of separate, circular and walled valving chambers; wherein
    each chamber of said rows thereof has first and second ports opening thereinto for admitting and discharging fluid, respectively, thereinto and therefrom;
    each chamber further has, therewithin, a valving element movable to and from one of said ports, for occluding and exposing, respectively, said one port;
    a chordal cross-section taken fully across said assembly is of a prescribed dimension, and bisects one of said rows of said valving chambers across the diameters of each of said chambers in said one row; and
    the sum of the dimensions of said diameters of said chambers in said one row is greater than said prescribed dimension.

5. A fluid valve assembly, according to claim 2, wherein:
    given ones of said chambers, along said plate, each overlie portions of a plurality of other said chambers along said plane.

6. A fluid valve assembly, according to claim 3, wherein:
    given ones of said chambers, along said plane, each underlie portions of a plurality of other said chambers along said plane.

7. A substantially circular, uni-directional flow, fluid valve assembly, having a given diameter, comprising:
    means defining pluralities of rows of separate, circular and walled valving chambers; wherein
    each chamber of said rows thereof has a first port opening thereinto for admitting fluid therein, and a second port opening thereinto for discharging fluid therefrom;
    each chamber further has, therewithin, a valving element movable to and from one of said ports, for occluding and exposing, respectively, said one port;
    a cross-section taken fully along said given diameter of said assembly is of a given dimension, and bisects one of said rows of said valving chambers across the diameters of each of said chambers in said one row; and
    the sum of the dimensions of said diameters of said chambers in said one row is greater than said given dimension; wherein
    said chambers-defining means comprises first and second valving plates, mounted together, in which the first valving plate is in surmounting relationship to the other thereof;
    one of said valving plates has alternate ones of said chambers of said rows formed therein; and
    the other of said valving plates has all other chambers, i.e., those other than said alternate ones, of said rows formed therein.

8. A fluid valve assembly, according to claim 7, wherein:
    said chambers-defining means further comprises a stop plate surmounting said first valving plate;
    said stop plate has rows of apertures formed therein which align with all of said chambers in said valving plates; and
    alternate ones of said apertures each comprises said one port of one each of said chambers formed in said first valving plate.

9. A fluid valve assembly, according to claim 2, wherein:
    given ones of said chambers, along said plane, each overlie portions of (a) a plurality of other of said chambers along said plane, and (b) other chambers subsisting in said rows other than said one row.

10. A fluid valve assembly, according to claim 3, wherein:
    given ones of said chambers, along said plane, each underlie portions of (a) a plurality of other of said chambers along said plane, and (b) other chambers subsisting in rows other than said one row.

11. A fluid valve assembly, according to claim 7, wherein:
    said first valving plate has an upper surface and a lower surface;

said other valving plate is in engagement with said lower surface; and said lower surface defines a stop surface for said valving elements within said other chambers in said other valving plate.

12. A fluid valve assembly, according to claim 7, wherein:

each of said plates has a plurality of one of said first and second ports formed therein for each thereof to communicate with one of the chambers formed therein; and each of said plates has passageways formed therein, intermediate said chambers and said latter ports, said passageways communicating each of said chambers with one of said latter ports.

13. A fluid valve assembly, according to claim 12, wherein:

each of said passageways has a plurality of ribs intruding thereinto;

each of said ribs has a given land; and said lands of said ribs comprise seats upon which said valving elements come to rest upon moving from said one ports.

14. a fluid valve assembly, according to claim 13, wherein:

each of said ribs further has a second land; and further including means engaged with said second lands and said valving elements normally urging said valving elements toward said one ports.

* * * * *